United States Patent
Irving

[15] 3,642,406
[45] Feb. 15, 1972

[54] MIXING, EXTRUDING, AND SEVERING APPARATUS

[72] Inventor: Henry F. Irving, Saginaw, Mich.
[73] Assignee: Baker Perkins Inc., Saginaw, Mich.
[22] Filed: Jan. 7, 1971
[21] Appl. No.: 104,666

Related U.S. Application Data

[63] Continuation-in-part of Ser. No. 688,398, Dec. 6, 1967, Pat. No. 3,564,650, which is a continuation-in-part of Ser. No. 461,840, June 7, 1965, Pat. No. 3,362,044.

[52] U.S. Cl. ..............................425/198, 425/204, 425/307, 425/382
[51] Int. Cl. ..........................................................B29f 3/04
[58] Field of Search ..................18/12 A, 12 SA, 8 SF, 12 DM

UNITED STATES PATENTS

| 2,319,859 | 5/1943 | Hale | 18/12 A X |
| 2,875,798 | 3/1959 | Kunzi et al. | 18/12 A X |
| 3,023,455 | 3/1962 | Geier et al. | 18/12 A UX |
| 3,307,216 | 3/1967 | Dunn et al. | 18/8 SF |
| 3,337,913 | 8/1967 | List | 18/12 A |

*Primary Examiner*—J. Spencer Overholser
*Assistant Examiner*—Michael O. Sutton
*Attorney*—Learman & McCulloch

[57] ABSTRACT

A mixer and extruder of the type employing a reciprocating and revolving material advancing shaft in a mixing chamber has a die mounted on its front end for reciprocation and rotation with the shaft, there being generally radially extending extrusion ports provided in the die and a cutter for severing the material extruded in strands radially from the die.

9 Claims, 4 Drawing Figures

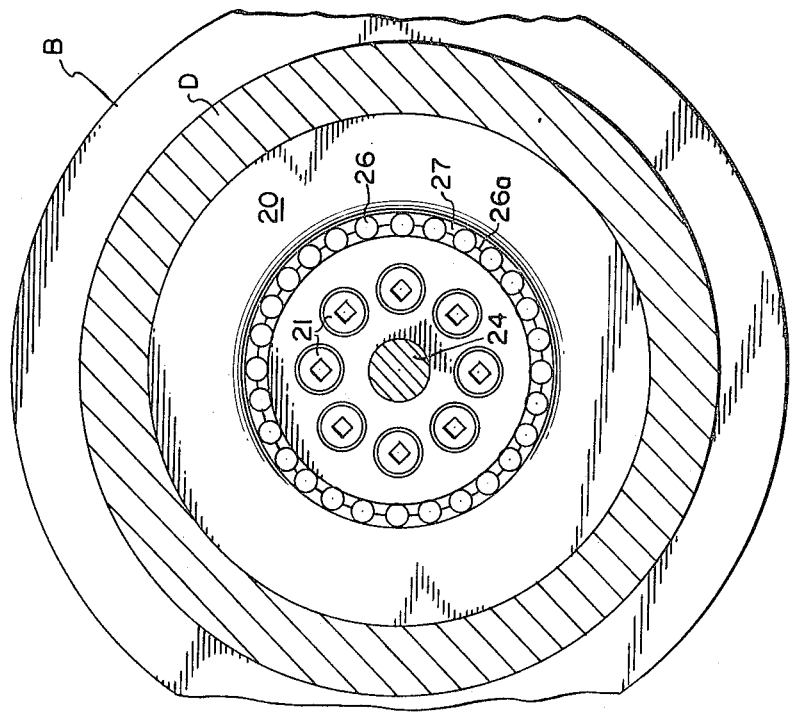
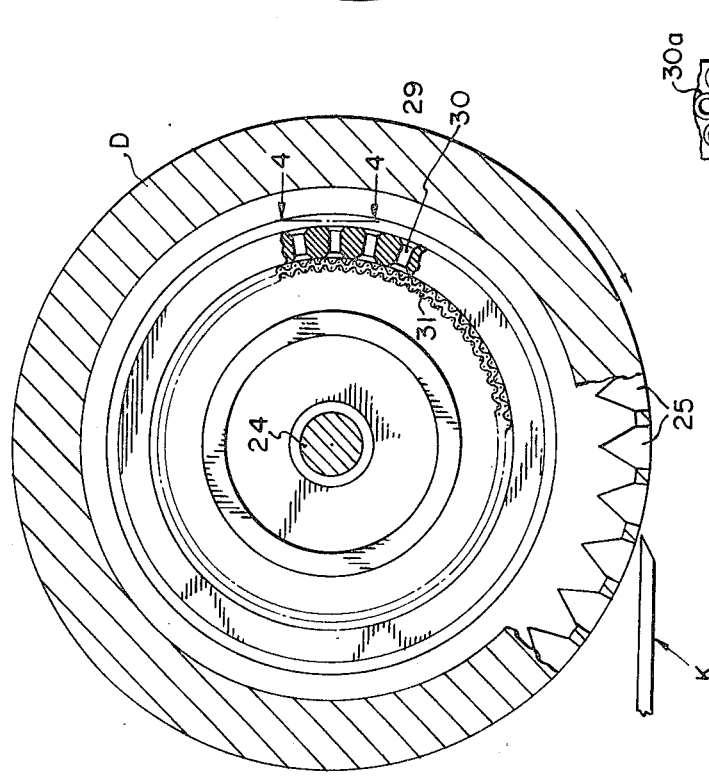
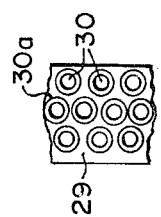

MIXING, EXTRUDING, AND SEVERING APPARATUS

This application is a continuation-in-part of my copending application, Ser. No. 688,398, entitled "Apparatus for Extruding Plastic Strands and Cutting Them Into Pellets", filed Dec. 6, 1967, now U.S. Pat. No. 3,564,650, issued Feb. 23, 1971, which is a continuation-in-part of my earlier application, Ser. No. 461,840, filed June 7, 1965, and entitled "Mixing and Severing Apparatus", now U.S. Pat. No. 3,362,044, issued Jan. 9, 1968.

One of the prime objects of the present invention is to provide apparatus of the character described which delivers steady, nonpulsating flows of plastic material from radial extrusion ports.

A further object of the invention is to provide a machine for extruding plastics and like materials which is able to employ a kneading and advancing screw, having both a reciprocatory and rotary movement, without obtaining a pulsating discharge which would interfere with the uniformity of product produced.

Another object of the invention is to provide a machine of the character described which permits the uniform feeding of severed plastic chunks to a calendering machine.

Still another object of the invention is to utilize a construction of the type mentioned which permits disposition of a screen pack in the die, positioned so that there is a constant pressure across the screen pack permitting a maximum throughput of product for a given area, and wherein the constant back pressure which results helps achieve a more uniform mixing and permits a certain control of mixing by use of a finer or coarser mesh screen, as desired.

Another object of the invention is to provide readily controlled apparatus for radially extruding plastic strands and cutting them into lengths.

My earlier filed case, application Ser. No. 688,398, disclosed a construction wherein plastic strands were extruded axially from a die fixed to a reciprocating and rotating mixing shaft and a cutter for cutting the plastic strands extruded into pellets was mounted for reciprocation with the extrusion die. The present machine is of similar design but provides a radial extrusion capability. With a machine of this character, severing knives which are stationary or which rotate can be used, depending upon the product to be produced.

In addition to a reciprocating and revolving shaft with interrupted flights thereon, cooperating with kneading lugs provided on the interior of the chamber in which the shaft is revolved, the present construction employs a die fixed to the revolving and reciprocating shaft which has a rearwardly extending sleeve circumferentially spaced from the shaft to define a material issuing channel between the sleeve and shaft leading to radially extending discharge ports in the die. The die at both extremes of its reciprocatory movement is outside the chamber and it is the material channeling sleeve which substantially seals the front end of the chamber.

Other objects and advantages of the invention will be pointed out specifically or will become apparent from the following description when it is considered in conjunction with the appended claims and the accompanying drawings, in which:

FIG. 2 is an enlarged cross-sectional view taken on the line 2—2 of FIG. 1;

FIG. 3 is an enlarged cross-sectional view, taken on the line 3—3 of FIG. 1; and FIG. 4 is a fragmentary, elevational view taken on the line 4—4 of FIG. 2.

Figure 1:
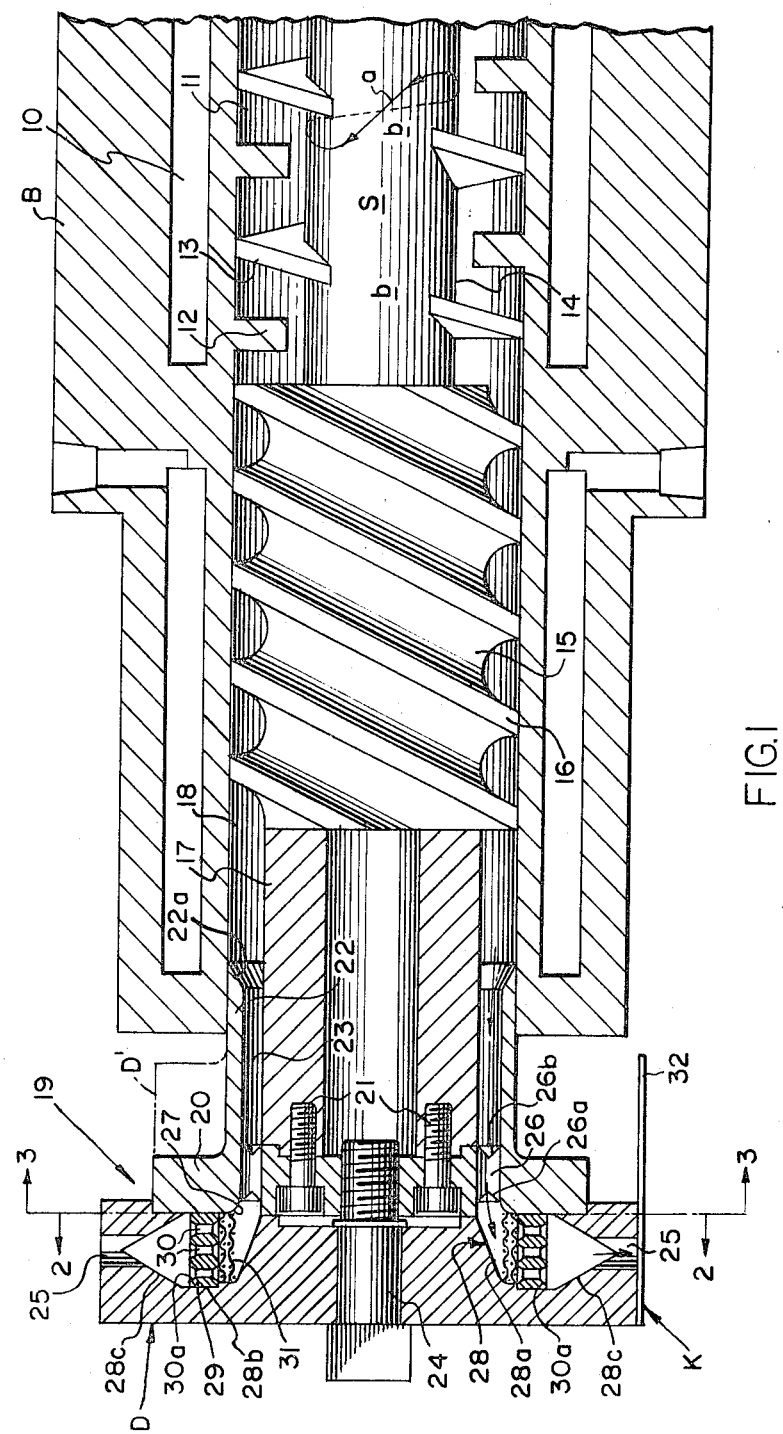
FIG. 1 is a sectional plan view of the discharge end of the apparatus only.

Referring now more particularly to the accompanying drawings, I have for purposes of convenience, shown only the discharge end of the machine and I incorporate herein by reference, earlier U.S. Pat. Nos. 3,023,455 and 3,362,044 along with the earlier mentioned copending application Ser. No. 688,398. As will be well understood after reference to the patents mentioned, the machine in question includes a barrel B which is jacketed as at 10 so that heating or other temperature maintaining fluid may be circulated to control the temperature of the mixing chamber 11. It is to be understood that the material to be mixed is fed to the right end of the mixing chamber 11 through the usual hopper (not shown) and is advanced continuously from right to left by a mixing shaft S which is both reciprocated and revolved in the manner disclosed in the patents mentioned, as indicated by the arrow $a$.

Provided on the barrel B and projecting into the mixing chamber 11 are circumferentially spaced, radially inwardly projecting teeth or lugs 12 which cooperate with interrupted helical threads or blades 13 provided on a portion 14 of the shaft S in helical formation in a manner to achieve the intimate blending and kneading of the material introduced to the chamber 11. The threads or flight sections 13 are so pitched that, if the shaft S is revolved in a clockwise direction as viewed from the right end of the machine, material will be moved forwardly from right to left, it being understood that the shaft S is simultaneously reciprocated in timed relation with its rotation and the disposition of teeth 12 so that during the stoke of the shaft S the teeth 12 pass through the spaces $b$ between the interrupted blades 13. It may be assumed that the blades which form the threaded portions 13 are interrupted at 180° intervals, and the shaft then, of course, must rotate 180° during both the forward and rearward portions of the reciprocatory stroke.

At its front end the shaft S mounts a continuous, as distinguished from discontinuous, advancing screw section 15 having flights 16 pitched to move the plasticized material forwardly from right to left when the shaft S is revolved in the direction $a$. Extending forwardly of the screw section 15 is a tubular portion 17, which is reduced in diameter relative to the interior diameter of chamber 11, so that a material accumulating chamber 18 is provided surrounding it. The interior diameter of the tubular chamber 18 corresponds to the root diameter of the threaded section 15.

It is to be understood that material such as plasticized polyvinyl chloride moves continuously through the machine and is first heated and then intimately kneaded and blended in the right end of the machine due to the intermixing action of discontinuous flights 13 and lugs 12. The material then passes via flights 16 to the chamber 18 and on to an extruding die assembly I have chosen to generally designate 19. The die assembly 19 includes a die holder member 20 which is secured to the end of section 17 by means of bolts 21, and which is provided with a rearwardly extending sleeve section 22, having a sliding clearance fit with the exterior wall of chamber 18. At its rear end the sleeve 22 is beveled as at 22a to channel the material into the chamber 23 formed between the sleeve 22 and shaft front section 17.

Bolts 24 may be used to secure a radially discharging die, generally designated D, on the front face or end of die holder 20 in the manner indicated in FIG. 1. Provided in the die D, are a series of uniformly circumferentially spaced discharge ports 25 (see FIGS. 1 and 2) which communicate with the chamber 23 to receive plastic therefrom in a manner which will now be described.

The die holder member 20 is provided with V-grooves 26a and 26b connected by axial ports 26 which communicate the space 23 with an inset annular channel 27 provided in the front face of member 20 opposite an annular passage 28 provided in the rear face of the die D. The passage 28, which extends radially in the die D, includes an entrance portion 28a, an intermediate section 28b for receiving a screen support 29 having radially extending orifices 30 covered at their radially inner ends by a mesh screen pack 31, and a convergent exit portion 28c which communicates with the discharge ports 25 in the manner indicated in FIG. 1. The radial ports 30 are countersunk at both ends as at 30a, as will be observed. The screen pack 31 normally comprises a series of superposed screens of coarse, intermediate, and fine rectangular mesh for filtering out, particularly, hard foreign material which might otherwise damage subsequent processing equipment such as highly polished calendering rolls. The screens also prevent the passage of any lumps of unmelted polymer. Normally, the screens are releasably clamped to the support 29.

Provided to cooperate with the ports 25 and cut the strands of material issuing from ports 25 into lengths, suitable for passing to a calendering machine, for example, is a knife system, generally designated K, which may include a plurality of stationary knives 32 situated about the periphery of the die D in the manner disclosed in U.S. Pat. No. 3,023,455. When such knives K are stationarily mounted, the rotation of the shaft S, and the die D fixed thereto, will be sufficient in cooperation with the knives 32, to cut material being extruded into lengths. Desirably, the knife K will be of sufficient width (see FIG. 1), so that the die D can reciprocate with regard thereto, without losing contact with the blades 32. Thus, as FIG. 1 indicates, it will be of sufficient width to cover the stroke of the die assembly 19 which is portrayed by the solid lines in FIG. 1 in a forwardmost position and by the chain lines 19 in an axially rearmost position.

In operation, the advancing pressure exerted by discontinuous flights 13 and forwarding flights 15 is sufficient, in spite of the reciprocatory movement of shaft S, to continuously forward material first to space 18, and thence to the sleeve space 23 and on through holder exit ports 26. The advancing pressure maintained is sufficient to avoid any pulsating discharge from the ports 25. From the ports 26, the material moves through the screen pack represented by screens 31 and screen support 29, through the radial ports 21 and on, via converging channel 28c, to the ports 25. The machine is particularly suitable as described for producing discs which are to be delivered in a hot state to calendering rolls.

Because the so-called screen pack has radial ports and the material is directed through it in a radial direction, the reciprocatory movement of the shaft S in an axial direction does not vary the advancing pressure exerted by the material on it. Moreover, as previously noted, by simply substituting a finer or coarser mesh screen as desired, some control of the intensity of mixing can be achieved since uniform back pressures result. The pack can be readily changed by simply removing bolt 24, lifting off the screen holder 29 and screens 31 releasably fixed to it, and substituting a new one. The machine could also be used to produce pellets or granules by providing a knife system K which is counterrotated at a sufficient speed. For instance, the structure employed in U.S. Pat. No. 3,023,455 could be conveniently employed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a mixer and extruder: a barrel having a chamber; means for supplying material to be mixed and extruded to said chamber; a shaft in said chamber with material advancing means thereon for advancing material toward one end of said chamber; means for revolving and reciprocating said shaft to mix and advance the material; a die assembly mounted on the front end of said shaft for reciprocation therewith and having generally radially extending extrusion die port means through which said material is extruded, said die assembly including a rearwardly extending sleeve spaced radially from said shaft to define material issuing passage means therebetween leading to said port means; and cutting means radially exteriorly adjacent said port means for cutting off lengths of material extruded through said port means.

2. The combination defined in claim 1 in which a screen member having radially disposed openings is provided within said die port means.

3. The combination defined in claim 2 in which said die assembly includes: a die plate with a series of circumferentially spaced apart discharge ports in said plate and an annular recess in the rear face of said plate leading to said ports, forming said port means; and a die holder, from which said sleeve extends rearwardly, having a front plate portion covering said recess; said front plate portion being axially ported to communicate said recess and sleeve.

4. The combination defined in claim 1 in which said die assembly is forward of said chamber throughout its stroke and said sleeve moves axially in and seals the front end of said chamber.

5. The combination defined in claim 2 in which said screen member comprises an axially extending screen pack.

6. The combination defined in claim 5 in which said screen pack comprises an upstream support with radial ports therethrough, and a plurality of downstream screens are provided, fixed on said pack and covering said latter mentioned ports.

7. The combination defined in claim 6 in which said die port means downstream of said screen pack support comprises a convergent annular portion leading to circumferentially spaced cylindrical discharge ports.

8. The combination defined in claim 3 in which said shaft is provided with a reduced diameter front end portion relative to said sleeve to define a material channeling passage therebetween, and said die holder is fixed thereto.

9. The combination defined in claim 8 in which said die plate is releasably secured to said die holder front plate and a screen pack is trapped therebetween which can be readily changed by simply removing the die plate from the die holder.

* * * * *